(12) United States Patent
Civiero et al.

(10) Patent No.: US 11,591,043 B2
(45) Date of Patent: Feb. 28, 2023

(54) SPROCKET-CARRYING BODY AND SUB-ASSEMBLY OF SPROCKET-CARRYING BODY AND COGSET FOR A BICYCLE REAR WHEEL

(71) Applicant: CAMPAGNOLO S.r.l., Vicenza (IT)

(72) Inventors: Mirco Civiero, Montecchia di Crosara (IT); Marco Marchi, Marzabotto (IT)

(73) Assignee: CAMPAGNOLO S.r.l., Vicenza (IT)

( * ) Notice: Subject to any disclaimer, the term of this patent is extended or adjusted under 35 U.S.C. 154(b) by 300 days.

(21) Appl. No.: 16/937,281

(22) Filed: Jul. 23, 2020

(65) Prior Publication Data

US 2021/0031876 A1 Feb. 4, 2021

(30) Foreign Application Priority Data

Jul. 30, 2019 (IT) .......................... 102019000013287
Oct. 14, 2019 (IT) .......................... 102019000018749

(51) Int. Cl.
*B62M 9/10* (2006.01)
*F16H 55/30* (2006.01)

(52) U.S. Cl.
CPC ............... *B62M 9/10* (2013.01); *F16H 55/30* (2013.01)

(58) Field of Classification Search
CPC .................................. B62M 9/10; B62M 9/12
USPC ........................................................ 474/160
See application file for complete search history.

(56) References Cited

U.S. PATENT DOCUMENTS

| | | | |
|---|---|---|---|
| 3,900,088 A | 8/1975 | Ozaki | |
| 4,472,163 A | 9/1984 | Bottini | |
| 5,704,859 A | 1/1998 | Feng | |
| 6,264,575 B1 * | 7/2001 | Lim | F16D 41/30 192/64 |
| 6,428,437 B1 * | 8/2002 | Schlanger | B62M 9/12 474/160 |
| 7,959,529 B2 * | 6/2011 | Braedt | B62M 9/10 474/158 |
| 8,197,371 B2 * | 6/2012 | D'Aluisio | B62M 9/12 301/110.5 |
| 8,663,044 B2 * | 3/2014 | Lin | B62M 9/10 474/160 |
| 8,820,852 B2 | 9/2014 | Van Hoek | |
| 8,956,254 B2 | 2/2015 | Tokuyama | |

(Continued)

FOREIGN PATENT DOCUMENTS

| | | |
|---|---|---|
| DE | 94 08 910 U1 | 7/1994 |
| EP | 1 342 657 A2 | 9/2003 |

(Continued)

OTHER PUBLICATIONS

European Search Report for European Application No. 20187782.6, dated Nov. 30, 2020.

*Primary Examiner* — Henry Y Liu

(74) *Attorney, Agent, or Firm* — Volpe Koenig

(57) ABSTRACT

A cogset with a plurality of sprockets has a subset of the sprockets connected together in a monolithic subset that is mounted directly in engagement with a coupling profile on the radially peripheral surface of a sprocket in the monolithic subset. The direct shape coupling between the sprocket of the monolithic subset and the sprocket-carrying body makes it possible to have very high solidity and rigidity of coupling to ensure the maximum precision of actuation of the gearshift that uses the sub-assembly.

15 Claims, 4 Drawing Sheets

(56) References Cited

U.S. PATENT DOCUMENTS

| | | | |
|---|---|---|---|
| 9,150,280 B2* | 10/2015 | Braedt | B62M 9/10 |
| 9,182,016 B2* | 11/2015 | Spahr | F16H 9/06 |
| 9,533,735 B2* | 1/2017 | Braedt | F16H 9/24 |
| 10,773,772 B2* | 9/2020 | Fukumori | F16H 55/30 |
| 10,774,915 B2* | 9/2020 | Iwai | B62M 9/10 |
| 10,946,933 B2* | 3/2021 | Braedt | B62M 9/10 |
| 11,192,606 B2* | 12/2021 | Braedt | B62M 9/10 |
| 11,199,252 B2* | 12/2021 | Civiero | B60B 27/023 |
| 2003/0064844 A1* | 4/2003 | Lin | B62M 9/10 474/158 |
| 2004/0142783 A1 | 7/2004 | Kamada | |
| 2005/0009654 A1 | 1/2005 | Kanehisa | |
| 2006/0014599 A1 | 1/2006 | Meggiolan | |
| 2006/0063624 A1* | 3/2006 | Voss | B62M 9/105 474/78 |
| 2008/0004143 A1 | 1/2008 | Kanehisa | |
| 2008/0188336 A1* | 8/2008 | Tokuyama | B62M 9/10 474/160 |
| 2008/0230344 A1* | 9/2008 | Braedt | B62M 9/10 192/64 |
| 2008/0231014 A1* | 9/2008 | Braedt | B62M 9/10 280/260 |
| 2008/0234082 A1 | 9/2008 | Braedt | |
| 2009/0042679 A1* | 2/2009 | Valle | B62M 9/10 474/160 |
| 2009/0042681 A1* | 2/2009 | Dal Pra' | B62M 9/10 474/160 |
| 2009/0098966 A1 | 4/2009 | Kamada | |
| 2009/0191996 A1* | 7/2009 | D'Aluisio | B62M 9/12 192/64 |
| 2010/0009794 A1* | 1/2010 | Chiang | B62M 9/10 474/160 |
| 2010/0075791 A1* | 3/2010 | Braedt | B62M 9/10 474/160 |
| 2010/0099530 A1* | 4/2010 | Chiang | B62M 9/10 474/160 |
| 2011/0092327 A1 | 4/2011 | Oishi | |
| 2011/0168513 A1* | 7/2011 | Filipe | F16D 41/30 192/64 |
| 2012/0196711 A1 | 8/2012 | Loy | |
| 2012/0208662 A1* | 8/2012 | Braedt | B62M 9/10 474/160 |
| 2012/0225745 A1 | 9/2012 | Oishi | |
| 2012/0244976 A1* | 9/2012 | Lin | B62M 9/10 474/160 |
| 2012/0244977 A1 | 9/2012 | Liao | |
| 2012/0244978 A1 | 9/2012 | Liao | |
| 2012/0302384 A1* | 11/2012 | Braedt | B62M 9/10 474/160 |
| 2012/0322598 A1* | 12/2012 | Lin | B62M 9/10 474/160 |
| 2013/0017914 A1* | 1/2013 | Braedt | B62M 9/10 403/299 |
| 2013/0035183 A1* | 2/2013 | Tokuyama | B62M 9/10 474/78 |
| 2013/0225343 A1* | 8/2013 | Spahr | B60B 27/04 474/160 |
| 2014/0110208 A1* | 4/2014 | Braedt | B60B 27/023 192/46 |
| 2014/0179474 A1 | 6/2014 | Florczyk | |
| 2015/0024884 A1 | 1/2015 | Braedt | |
| 2015/0133249 A1 | 5/2015 | Tsai | |
| 2016/0059932 A1* | 3/2016 | Braedt | B62M 9/10 474/160 |
| 2016/0083045 A1* | 3/2016 | Lin | F16H 55/30 474/160 |
| 2016/0114859 A1 | 4/2016 | Tsai | |
| 2016/0167737 A1 | 6/2016 | Tokuyama | |
| 2016/0176477 A1* | 6/2016 | Bernardele | B62M 9/12 474/160 |
| 2016/0258523 A1 | 9/2016 | Reineke | |
| 2016/0362159 A1 | 12/2016 | Braedt | |
| 2017/0043840 A1* | 2/2017 | Reinbold | F16H 55/30 |
| 2017/0057598 A1* | 3/2017 | Thrash | B62M 9/10 |
| 2017/0217539 A1* | 8/2017 | Braedt | B62M 9/121 |
| 2018/0022415 A1 | 1/2018 | Oishi | |
| 2018/0022416 A1 | 1/2018 | Oishi | |
| 2018/0215444 A1* | 8/2018 | Reinbold | B62M 9/10 |
| 2019/0054765 A1* | 2/2019 | Thrash | B60B 27/047 |
| 2019/0063585 A1 | 2/2019 | Fujita | |
| 2019/0178313 A1* | 6/2019 | Wrobel | F16D 48/06 |
| 2019/0225301 A1* | 7/2019 | Emura | F16H 55/12 |
| 2019/0225302 A1* | 7/2019 | Emura | B62M 9/10 |
| 2019/0263473 A1* | 8/2019 | Braedt | B62M 9/105 |
| 2019/0359284 A1* | 11/2019 | Fukunaga | F16H 55/30 |
| 2020/0062033 A1* | 2/2020 | Bots | F16D 1/10 |
| 2020/0269953 A1* | 8/2020 | Fukunaga | B62M 9/10 |
| 2021/0284281 A1* | 9/2021 | Carrasco Vergara | B62M 9/121 |

FOREIGN PATENT DOCUMENTS

| | | |
|---|---|---|
| EP | 1 495 879 A2 | 1/2005 |
| EP | 3 109 062 A1 | 12/2016 |

* cited by examiner

SPROCKET-CARRYING BODY AND SUB-ASSEMBLY OF SPROCKET-CARRYING BODY AND COGSET FOR A BICYCLE REAR WHEEL

CROSS REFERENCE TO RELATED APPLICATIONS

This application claims the benefit of Italian Application No. 102019000013287, filed on Jul. 30, 2019 and Italian Application No. 102019000018749, filed on Oct. 14, 2019, each of which is incorporated herein by reference as if fully set forth.

FIELD OF INVENTION

The present invention relates to a sprocket-carrying body and a sub-assembly for a bicycle rear wheel, formed from a sprocket-carrying body and a cogset mounted coaxially on the sprocket-carrying body through shape engagement of the cogset on a coupling profile formed on the radially peripheral surface of the sprocket-carrying body and extending in the axial direction.

BACKGROUND

Hereinafter, the spatial indications, such as in particular those of radial, axial and circumferential direction, will be given with reference to the rotation axis of the rear wheel of the bicycle, which coincides with the axis of the cogset, of the sprocket-carrying body, of the hub of the wheel and in general of all of the elements that rotate with the wheel. Moreover, the axial direction will be indicated as towards the outside if directed away from the longitudinal mid-plane of the bicycle or away from the hub of the wheel, and vice-versa as towards the inside if directed towards such a mid-plane or towards the hub. Moreover, in the radial direction, an orientation away from the rotation axis will be indicated as peripheral and vice-versa an orientation towards the rotation axis will be indicated as inner.

In order to mount a cogset on the hub of a bicycle rear wheel a so-called sprocket-carrying body is normally used, which on one side is made to rotate as a unit with the sprockets through shape coupling, and on the other side is made to rotate as a unit—but in a unidirectional manner—with the hub through a set of ratchets or similar, commonly called free wheel. In this way, the transmission chain engaged with the various sprockets is capable of transmitting a torque to the hub in the advancing direction of the bicycle.

The sprocket-carrying body essentially consists of a tubular body, which is mechanically coupled at the radially peripheral surface thereof with central mounting openings made in the sprockets. The radially peripheral surface of the sprocket-carrying body is shaped with substantially axial ribs and grooves, alternating in the circumferential direction, adapted for allowing the aforementioned shape coupling. For this purpose, the central mounting openings of the sprockets are provided with radially inner extensions or projections, i.e. directed towards the rotation axis, which couple with the grooves present on the sprocket-carrying body.

The sprockets are thus mounted axially on the sprocket-carrying body in succession, from the sprocket having the largest diameter, so that when the sprocket-carrying body is mounted on the hub of the wheel of the bicycle the sprockets having the largest diameter are located towards the inside, i.e. close to the rear wheel, whereas the sprockets having the smallest diameter are located towards the outside.

In most modern bicycle gearshifts, particularly for bicycles intended for competition, there is a well-known trend to increase the number of sprockets. When a cogset reaches 11, 12 or even more sprockets, it may be possible to do without the front gearshift; this simplifies and lightens the bicycle, which is undoubtedly appreciated by the cyclist provided that it is not accompanied by a penalization in the availability of gear ratios.

In order to allow this result, it is necessary to have a small sprocket with a very low number of teeth, for example 10 or 9, in the cogset. The reduced number of teeth, however, is clearly accompanied by a reduced diameter, which can end up being too small to allow it to be mounted on normal sprocket-carrying bodies.

Cogsets have thus become appreciated in which the smallest sprockets are made fixedly connected to one another to form a monolithic set (also called doublet, triplet or quadruplet, precisely because it groups together two, three or four sprockets), and the central opening for mounting on the sprocket-carrying body extends axially only at the largest sprockets of the set; the smallest sprockets extend more towards the rotation axis, but do not engage directly with the sprocket-carrying body, since it is ensured that they are set in motion by the fact that they are fixedly connected to the largest sprockets of the set. In this way, the smallest sprocket of the set can have 10 teeth or even less; on the other hand, the largest sprocket of the set must have at least 11 teeth, to be able to engage with the sprocket-carrying body.

There are thus constraints that reflect on the real possibilities of manufacturing. For example, with a doublet (monolithic set of two sprockets) it is necessary to have a first sprocket with 10 teeth (and not 9 or less), or accept a difference in teeth between the first and the second sprocket equal to 2 or more; however, this condition is not liked by cyclists who are normally accustomed to differences of a single tooth between the smallest adjacent sprockets.

In some cases, in order to try to manage the constraints imposed by the particular conditions, shape couplings with projections or teeth extending in the axial direction, between the largest sprocket of the monolithic set and the sprocket-carrying body, or couplings through threaded portions variously engaged between the monolithic set and the sprocket-carrying body are used. These couplings, however, do not ensure the same solidity of the shape coupling with grooved profiles.

There is thus a need to be able to have greater flexibility in the selection of the number of teeth of the smallest sprockets of the cogset.

SUMMARY

The present invention provides a cogset and a sub-assembly having the cogset. The cogset has selected sprockets, preferably at least three, that are grouped in a monolithic set that makes it possible to have a sprocket with 11 teeth suitable for direct engagement on the sprocket-carrying body. Two or more smaller sprockets are cantilevered with the first sprocket having 9 or less teeth without it being necessary to accept a difference greater than 1 between the teeth of the adjacent smallest sprockets. A direct shape coupling is provided between the largest sprocket of the monolithic set and the sprocket-carrying body, which makes it possible to have very high solidity and rigidity of coupling, and ensure the maximum precision of actuation of the gearshift that uses the sub-assembly, comparable to the precision of a gearshift in which the sprockets of the cogset are all individually and directly mounted so as to rotate as a unit on the sprocket-carrying body.

BRIEF DESCRIPTION OF THE DRAWINGS

The features and advantages of the invention will become clearer from the following description of a preferred embodiment thereof, made with reference to the attached drawings. In such drawings.

DETAILED DESCRIPTION OF THE PREFERRED EMBODIMENTS

Figure 1:
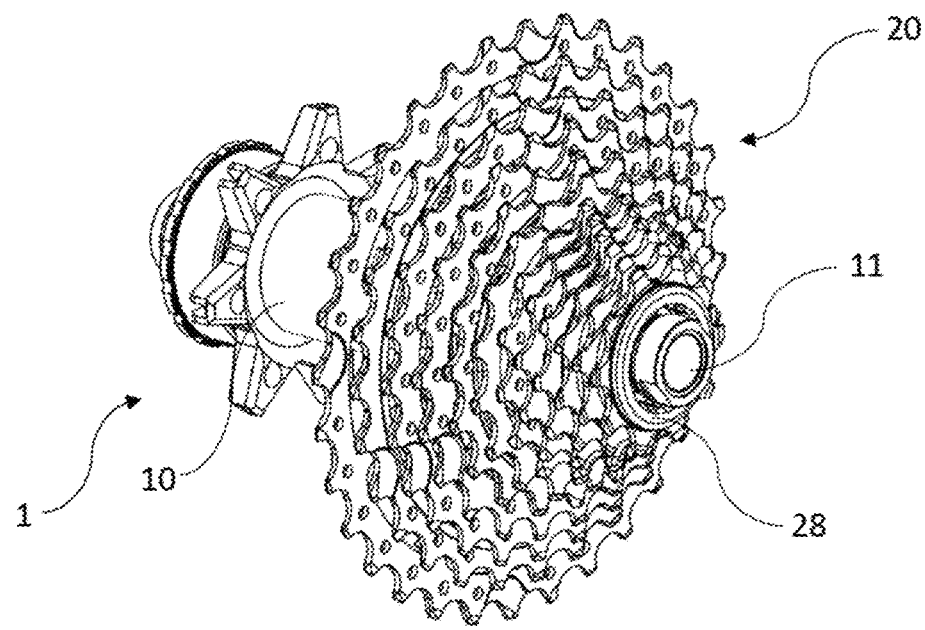
FIG. 1 is a perspective view of a hub of a bicycle rear wheel with a sub-assembly and a cogset according to the invention.
Figure 2:
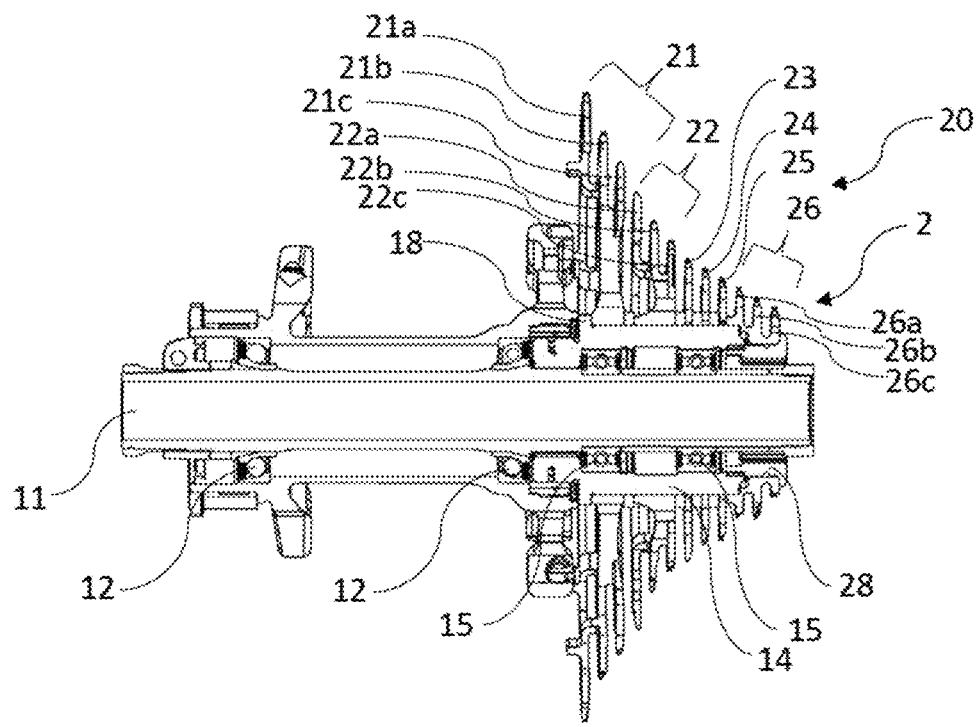
FIG. 2 is an axial section view of the hub of FIG. 1.
Figure 3:
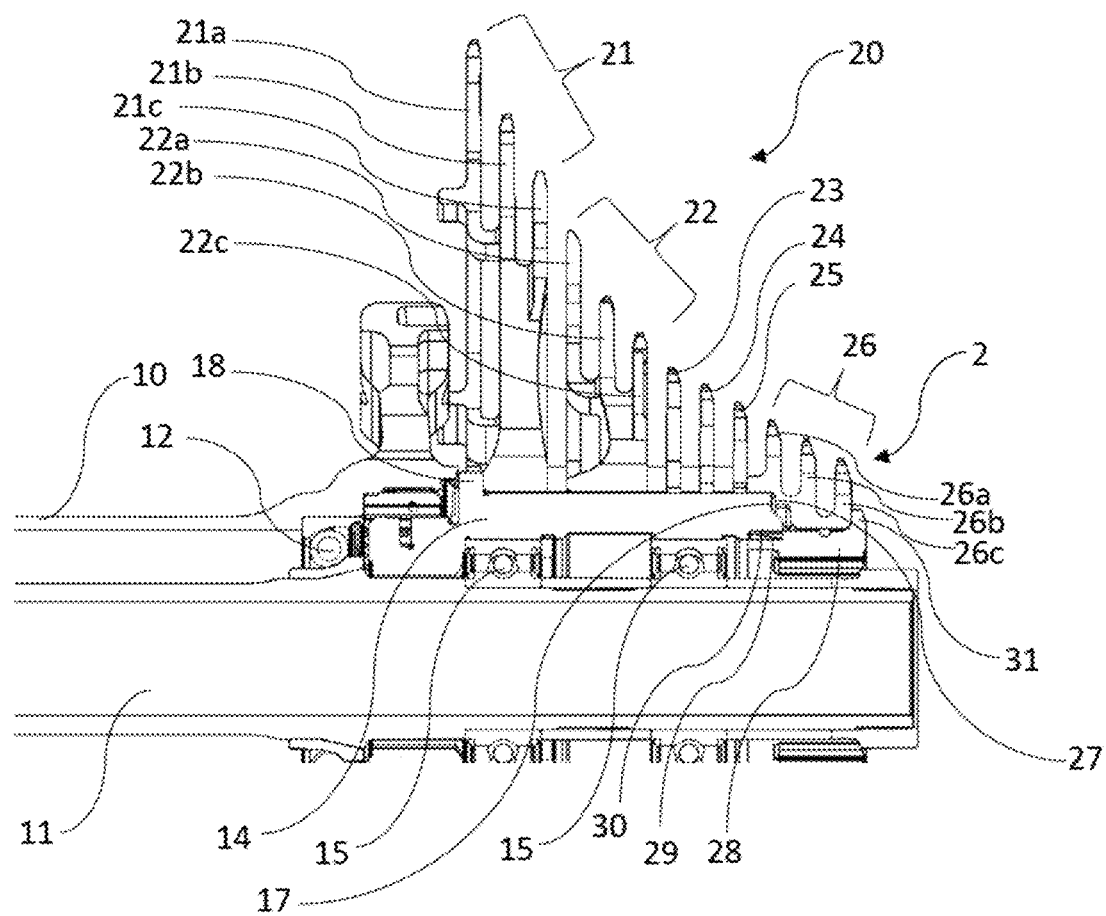
FIG. 3 is an enlarged section view of part of the hub of FIG. 2.
Figure 4:
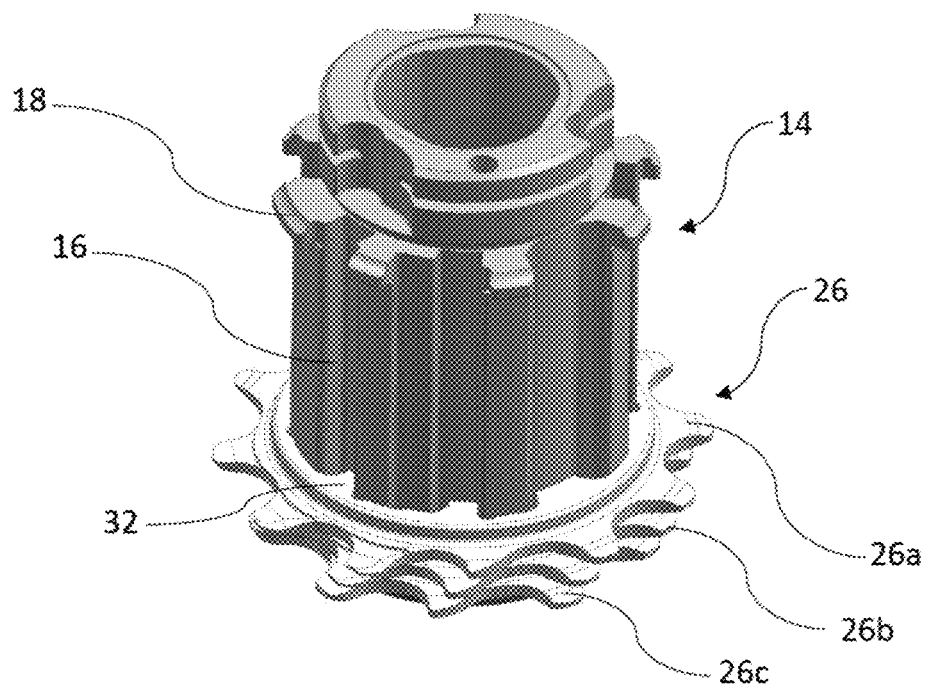
FIG. 4 is a perspective view of the sub-assembly of FIG. 1, with parts removed to better show the sprocket-carrying body and the monolithic set of the smallest sprockets.
Figure 5:
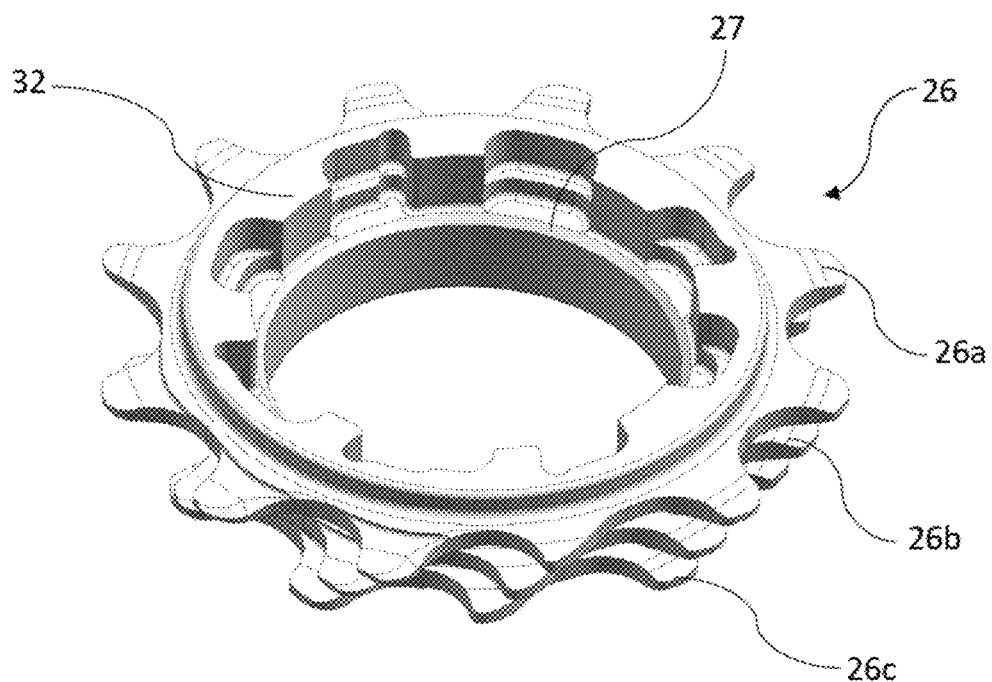
FIG. 5 is a perspective view of only the monolithic set shown in FIG. 4.

According to a first aspect of the invention, a cogset comprises a plurality of axially adjacent sprockets between a first sprocket having minimum number of teeth and a last sprocket having maximum number of teeth, wherein the first n sprockets with 6≥n≥3 are fixedly connected to one another so as to form a monolithic set, and in which the monolithic set is adapted for being directly in shape engagement on a coupling profile formed on the radially peripheral surface of the sprocket-carrying body through a coupling profile formed on the radially inner surface of at least the largest sprocket of the monolithic set.

Having at least three sprockets grouped in the monolithic set makes it possible to have a sprocket with 11 teeth suitable for direct engagement on the sprocket-carrying body and two or more smaller sprockets cantilevered; therefore, the first sprocket may have as few as 9 teeth (or less), without it being necessary to accept a difference greater than 1 between the number of teeth of the adjacent smallest sprockets. Moreover, the fact that a direct shape coupling is provided between the largest sprocket of the monolithic set and the sprocket-carrying body, and the fact that this direct coupling is made between the radially peripheral surface of the sprocket-carrying body and the radially inner surface of the largest sprocket (or of the largest sprockets) of the monolithic set, makes it possible to have very high solidity and rigidity of coupling, so as to ensure the maximum precision of actuation of the gearshift that uses the sub-assembly, comparable to the precision of a gearshift in which the sprockets of the cogset are all individually and directly mounted so as to rotate as a unit on the sprocket-carrying body.

Preferably, the first sprocket has 10, 9 or even 8 teeth. It is thus possible to achieve very long gear ratios of the gearshift.

Preferably, the number n of sprockets of the monolithic set is equal to 3, 4, 5 or even 6. The greater this number n, the greater the flexibility in the selection of the number of teeth of each of them and thus of the gear ratios.

In the case in which there are 5 sprockets of the monolithic set, the coupling profile between the monolithic set and the sprocket-carrying body is preferably formed on the radially inner surface of the two largest sprockets of the monolithic set.

In the case in which there are 6 sprockets of the monolithic set, the coupling profile between the monolithic set and the sprocket-carrying body is preferably formed on the radially inner surface of the three largest sprockets of the monolithic set.

These features make it possible to keep the solidity and the rigidity of the coupling between the sprockets of the monolithic set and the sprocket-carrying body high, even when the number n of sprockets of the monolithic set is relatively high.

Preferably, the cogset comprises 12, 13 or even 14 sprockets. The invention is indeed particularly interesting when the number of sprockets is high, greater than 11.

According to a second aspect of the invention, a sub-assembly comprises a sprocket-carrying body and a cogset mounted coaxially on the sprocket-carrying body, wherein the cogset comprises a plurality of axially adjacent sprockets between a first sprocket having minimum number of teeth and a last sprocket having maximum number of teeth, wherein the first n sprockets with 6≥n≥3 are fixedly connected to one another so as to form a monolithic set, and wherein the monolithic set is directly in shape engagement on a coupling profile formed on the radially peripheral surface of the sprocket-carrying body through a coupling profile formed on the radially inner surface of at least the largest sprocket of the monolithic set.

Preferably, the monolithic set comprises an axial abutment surface in abutting engagement against a corresponding outer axial abutment surface of the sprocket-carrying body. This allows a precise and stable axial positioning of the monolithic set with respect to the sprocket-carrying body.

Preferably, the sprocket-carrying body comprises a radially inner threaded portion.

Preferably, the sub-assembly further comprises a ring nut with a threaded portion screwed into the radially inner threaded portion of the sprocket-carrying body.

The attachment through the ring nut ensures a stable and precise positioning in the axial direction of the entire cogset on the sprocket-carrying body.

With reference now to the drawings, FIG. 1 represents a hub 10 of a hub assembly 1 of a bicycle rear wheel (not shown), mounted coaxially on a pin 11, by means of bearings 12; the hub 10 is thus free to rotate on the pin 11, whereas the latter is intended to be mounted fixed on the frame of the bicycle.

The hub 10 is coupled with a sprocket-carrying body 14, through a free wheel mechanism (not highlighted) that ensures that the hub 10 is set in rotation by the sprocket-carrying body 14 only in the direction that determines forward motion of the bicycle, not in the opposite direction. The sprocket-carrying body 14 has an approximately tubular shape and is mounted free on the pin 11, by means of bearings 15. The sprocket-carrying body 14 is provided on its radially peripheral surface with a coupling profile formed by grooves 16 arranged in the axial direction. Moreover, the sprocket-carrying body 14 is provided close to its axially inner end with an end stop 18, in the form of teeth projecting in the radial direction from the sprocket-carrying body 14; alternatively instead of the teeth, as end stop 18 it is possible to provide a flange, extending along the entire circumference of the sprocket-carrying body 14.

The sprocket-carrying body 14 has a substantially annular axial abutment surface 17 at the outer axial end thereof.

A cogset 20 is mounted on the sprocket-carrying body 14, with formation of a sub-assembly 2. The shown cogset 20 comprises 12 sprockets organized from the largest to the smallest as follows: the three largest sprockets 21a, 21b, 21c are made fixedly connected to one another to form a monolithic set (or triplet) 21; the next three sprockets 22a, 22b, 22c are made fixedly connected to one another to form a monolithic set (or triplet) 22; the next three sprockets 23, 24, 25 are independent from one another; the three smallest sprockets 26a, 26b, 26c are made fixedly connected to one another to form a monolithic set (or triplet) 26. These elements are mounted peripherally on the sprocket-carrying body 14, with the monolithic set 21 rested axially at the end stop 18, the monolithic set 22 rested axially at the monolithic set 21, the sprocket 23 rested axially at the monolithic set 22, the sprocket 24 rested axially at the sprocket 23, the sprocket 25 rested axially at the sprocket 24, the monolithic set 26 rested axially at the sprocket 25.

The monolithic sets 21, 22 and the sprockets 23-25 are slotted onto the sprocket-carrying body 14, constrained in rotation to the sprocket-carrying body 14 but substantially free in the axial direction; the constraint in rotation is ensured in a per se conventional manner by the grooves 16 that engage with corresponding projections (not visible in the figures) on the radially inner surface of the monolithic sets 21, 22 and of the sprockets 23-25.

In the sub-assembly 2 formed by the sprocket-carrying body 14 and the cogset 20, as stated, 12 sprockets are mounted, single or grouped in monolithic sets. In particular, there is a very small sprocket, the sprocket 26c, which has a number of teeth so low as not to be able to be mounted on the sprocket-carrying body 14 without the provision of having grouped it in the monolithic set 26. Indeed, if this small sprocket were single, it would be too small to be able to be slotted on the sprocket-carrying body 14; the monolithic set 26, on the other hand, can have an inner axial portion at the sprocket 26a (which has 12 teeth) of dimensions such as to be able to engage on the sprocket-carrying body 14.

The monolithic set 26, visible particularly in FIGS. 4-8, comprises—at the largest sprocket 26a—a series of projections 32 facing radially inwards, which as a whole constitute an inner shape coupling profile formed on the radially inner surface of the sprocket 26a. This coupling profile formed by the projections 32 has a shape corresponding to that of the coupling profile formed by the grooves 16 on the radially peripheral surface of the sprocket-carrying body 14. In mounting, the monolithic set 26 is thus partially slotted onto the sprocket-carrying body 14, with the projections 32 that engage in the grooves 16, whereas the smallest sprockets 26b and 26c of the monolithic set 26 remain axially cantilevered. This provision, made on the radially peripheral surface of the sprocket-carrying body 14, ensures that the entire monolithic set 26 (and therefore all of its sprockets 26a, 26b and 26c) is made to rotate as a unit with the sprocket-carrying body 14 in a stable and secure manner; any uncertainty of coupling (i.e. any possibility of angular micro-displacements of the monolithic set 26 with respect to the sprocket-carrying body 14), which would make the operation of a gearshift using the sub-assembly 2 imprecise, is thus ruled out.

The monolithic set 26 has a substantially annular axial abutment surface 27, at the inner shape coupling profile formed by the projections 32. The abutment surface 27 goes into abutting engagement against the corresponding axial abutment surface 17 of the sprocket-carrying body, thus acting as reference for the axial positioning of the monolithic set 26, preventing the axial sliding thereof.

Towards the inside in the axial direction (i.e. towards the hub 10), the entire cogset 20 (i.e. the monolithic sets 21, 22 and 26 and the sprockets 23-25) is held by the end stop 18; towards the outside in the axial direction, the cogset 20 is held by a ring nut 28, inserted on the pin 11 and screwed to the sprocket-carrying body 14, by means of an outer threaded portion 29 of the ring nut 28 and a radially inner threaded portion 30 of the sprocket-carrying body 14. The ring nut 28 has a flange 31 that goes into abutment axially against the outer face of the monolithic set 26. The clamping of the ring nut 28, with the axial pressure on the cogset 20 exerted by the flange 31 and by the end stop 18, ensures that the entire cogset 20 is locked on the sprocket-carrying body 14.

In use, the coupling of the monolithic set 26 with the sprocket-carrying body 14 is particularly solid, thanks to the engagement of the projections 32 in the grooves 16, and thus ensures high precision of actuation.

Figure 6:
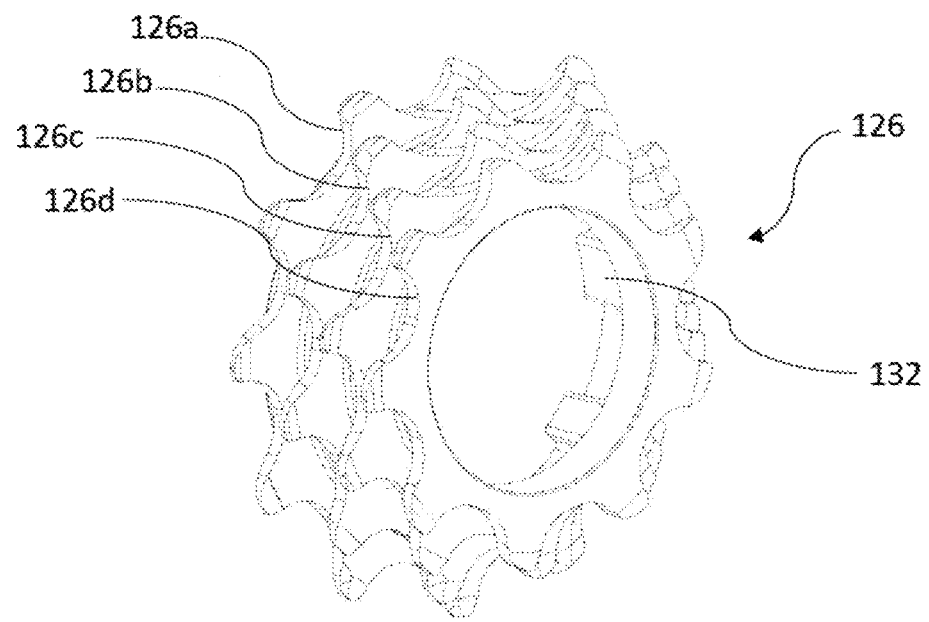
FIGS. 6 and 7 are perspective views from different angles of a variant of the monolithic set.
Figures 7, 8:
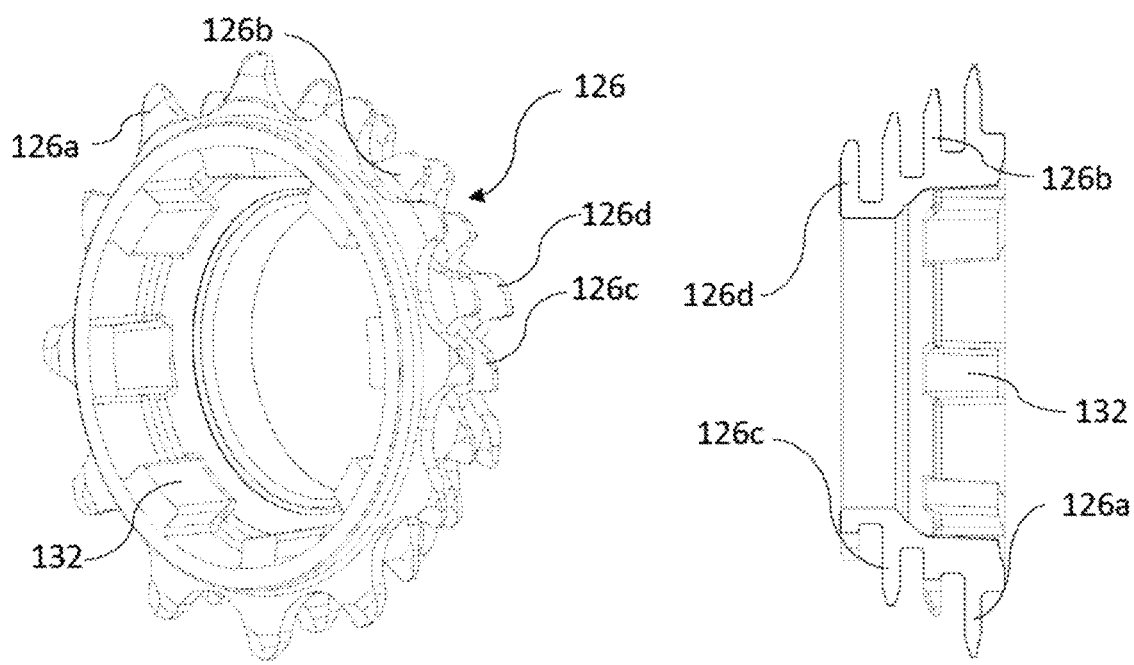
FIG. 8 is a section view of the monolithic set of FIGS. 6 and 7.

The monolithic set 26 shown in FIGS. 1-5, as stated, comprises the three smallest sprockets 26a, 26b and 26c of the cogset 20. According to the invention, however, the number of sprockets of the monolithic set can also be higher, up to 6. FIGS. 6-8, for example, show a monolithic set 126 (quadruplet) that groups together the four smallest sprockets 126a, 126b, 126c and 126d, having 12, 11, 10 and 9 teeth respectively.

In the monolithic set 126, the radially inner projections 132 are formed at the two largest sprockets 126a and 126b. In general, when the number of smallest sprockets grouped in a monolithic set increases, it is possible to ensure that the radially inner projections are formed at more than one sprocket, so as to increase the solidity of the coupling. If the number of smallest sprockets grouped in a monolithic set becomes particularly high, for example 5 or 6, it is undoubtedly preferable for the radially inner projections to be formed at more than one sprocket, for example 2 or 3, so as to reduce the axial extension of the cantilevered portion of the monolithic set, thus increasing the torsional rigidity of the monolithic set itself; this provision also facilitates the precision of actuation of a gearshift that uses this sub-assembly.

What is claimed is:

1. A cogset for a bicycle rear wheel, the cogset comprising a plurality of adjacent sprockets adapted for being mounted coaxially on a sprocket-carrying body, the plurality of adjacent sprockets numbering between 12 and 14 sprockets where a first sprocket has a minimum number of teeth and a last sprocket has a maximum number of teeth, wherein "n" sprockets from the plurality of sprockets are fixedly connected together in a monolithic set, where the range of "n" is $6 \geq n \geq 3$, and the monolithic set is adapted for direct engagement on a coupling profile formed on a radially peripheral surface of a sprocket-carrying body through a coupling profile formed on a radially inner surface of at least the largest sprocket of the monolithic set.

2. The cogset according to claim 1, wherein the first sprocket in the monolithic set has 10 teeth.

3. The cogset according to claim 1, wherein the first sprocket in the monolithic set has 9 teeth.

4. The cogset according to claim 1, wherein the first sprocket in the monolithic set has 8 teeth.

5. The cogset according to claim 1, wherein n=3.

6. The cogset according to claim 1, wherein n=4.

7. The cogset according to claim 1, wherein n=5 and the coupling profile between the monolithic set and the sprocket-carrying body is formed on a radially inner surface of the two largest sprockets of the monolithic set.

8. The cogset according to claim 1, wherein n=6 and the coupling profile between the monolithic set and the sprocket-carrying body is formed on a radially inner surface of the two largest sprockets of the monolithic set.

9. A sub-assembly for a bicycle rear wheel, the sub-assembly comprising a sprocket-carrying body and a cogset mounted coaxially on the sprocket-carrying body, wherein the cogset comprises a plurality of 12 to 14 axially adjacent sprockets between a first sprocket having a minimum number of teeth and a last sprocket having a maximum number of teeth, wherein the sprockets are mounted coaxially on a sprocket-carrying body, wherein "n" sprockets of the plurality of axially adjacent sprockets, where "n" is $6 \geq n \geq 3$, are fixedly connected in a monolithic set, and wherein the monolithic set is directly engaged on a coupling profile formed on a radially peripheral surface of the sprocket-carrying body through a coupling profile of the monolithic set.

10. The sub-assembly according to claim 9, wherein the monolithic set comprises an axial abutment surface in abutting engagement against a corresponding outer axial abutment surface of the sprocket-carrying body.

11. The sub-assembly according to claim 10, wherein the sprocket-carrying body comprises a radially inner threaded portion.

12. The sub-assembly according to claim 9, further comprising a ring nut with a threaded portion screwed into a radially inner threaded portion of the sprocket-carrying body.

13. The sub-assembly according to claim 10, further comprising a ring nut with a threaded portion screwed into a radially inner threaded portion of the sprocket-carrying body.

14. The sub-assembly according to claim 11, further comprising a ring nut with a threaded portion screwed into the radially inner threaded portion of the sprocket-carrying body.

15. A cogset for a bicycle rear wheel, the cogset comprising at least 12 and no more than 14 sprockets adapted for being mounted coaxially on a sprocket-carrying body, where a first sprocket has a minimum number of teeth and a last sprocket has a maximum number of teeth, and "n" sprockets are fixed together in a monolithic set that includes the first sprocket, where "n" is in the range of $6 \geq n \geq 3$, and the monolithic set is adapted for direct engagement on a coupling profile formed on a radially peripheral surface of a sprocket-carrying body through a coupling profile formed on a radially inner surface of at least a largest sprocket in the monolithic set.

* * * * *